US008448718B2

(12) United States Patent
White et al.

(10) Patent No.: US 8,448,718 B2
(45) Date of Patent: May 28, 2013

(54) MODIFIED HAND-HELD TOOL

(75) Inventors: Brian White, Bristol, RI (US); Colin White, Warren, RI (US)

(73) Assignee: Raytheon Company, Waltham, MA (US)

( * ) Notice: Subject to any disclaimer, the term of this patent is extended or adjusted under 35 U.S.C. 154(b) by 396 days.

(21) Appl. No.: 12/799,392

(22) Filed: Apr. 23, 2010

(65) Prior Publication Data

US 2011/0259622 A1 Oct. 27, 2011

(51) Int. Cl.
*B23B 45/04* (2006.01)
*B23P 17/04* (2006.01)

(52) U.S. Cl.
USPC .................. 173/1; 173/8; 173/218; 173/171; 403/79; 403/119; 403/150; 403/157

(58) Field of Classification Search
USPC .................. 173/1, 8, 218, 171; 403/79, 150, 403/119, 157
See application file for complete search history.

(56) References Cited

U.S. PATENT DOCUMENTS

| | | | | |
|---|---|---|---|---|
| 2,733,506 | A * | 2/1956 | Wild | 30/228 |
| 2,743,707 | A * | 5/1956 | Kellersman | 30/228 |
| 3,561,117 | A * | 2/1971 | Murbach | 30/228 |
| 3,996,821 | A * | 12/1976 | Murray | 81/177.2 |
| 4,051,351 | A * | 9/1977 | Mallick et al. | 700/90 |
| 5,375,330 | A * | 12/1994 | Herrmann | 30/228 |
| 5,664,274 | A * | 9/1997 | Collins | 7/129 |
| 6,230,598 | B1 * | 5/2001 | Ressler | 83/372 |
| 2006/0151567 | A1 * | 7/2006 | Roy | 227/175.1 |

* cited by examiner

*Primary Examiner* — Brian D. Nash
*Assistant Examiner* — Michelle Lopez
(74) *Attorney, Agent, or Firm* — Schwegman Lundberg & Woessner, P.A.

(57) ABSTRACT

A method of modifying a hand-held tool which having a stationary handle actuated by a movable handle connected to a movable tool jaw by a connection linkage, the method including removing the moving handle and the stationary handle. A pneumatic actuator with a piston rod is added. The connection linkage is modified to extend between the piston rod and the movable tool jaw. A trigger is added between the pneumatic actuator and a source of pressurized gas.

14 Claims, 6 Drawing Sheets

MODIFIED HAND-HELD TOOL

FIELD OF THE INVENTION

This invention relates to a method of modifying a hand-held tool.

BACKGROUND OF THE INVENTION

Some conventional hand-held tools, such as crimping tools, cutting tools, riveting tools, and the like, may require a very strong hand grip force be applied to the handles of the tool in order to achieve a high quality crimp, cut or similar type operation. Sometimes the force required to achieve a quality crimp or cut simply cannot be applied by certain individuals with limited strength and/or limited dexterity. In other cases, conventional hand-held tools may have handles that are too far apart to be effectively gripped by some individuals. Additionally, the force applied to the handles of a conventional hand-held tool can vary from person to person. The result of all of the above can be costly rejects, variations in the quality of crimps, ineffective cuts, and the like. Moreover, repeated use of such conventional hand-held tools can lead to physical ailments, such as carpal tunnel syndrome, or similar type problems. Operating a conventional hand-held tool in the close quarters of a housing cabinet can also be difficult.

BRIEF SUMMARY OF THE INVENTION

In one aspect, a method of modifying a hand-held tool having a stationary handle actuated by a movable handle connected to a movable tool jaw by a connection linkage is featured, the method including removing the moving handle and the stationary handle. A pneumatic actuator with a piston rod is added. The connection linkage is modified to extend between the piston rod and the movable tool jaw. A trigger is added between the pneumatic actuator and a source of pressurized gas.

In one embodiment, the connection linkage may include a lever coupled to the movable tool jaw and modifying the connection linkage may include adding a clevis assembly between the piston rod and the lever. The method of modifying the connection linkage may include adding an opening through in the lever of the connection linkage sized to receive a clevis pin. The clevis assembly may include a base and adding the clevis assembly may include the step of forming an opening in the base configured to engage the piston rod. Adding the clevis assembly may include forming a pair of opposing arms extending from the base each having an opening therein configured to receive the clevis pin. Modifying the connection linkage may include inserting the clevis pin between the openings of the opposing arms of the clevis and the opening in the lever of the connection linkage and securing a retaining ring to the clevis pin. The base of the clevis assembly may include a shelf and adding the clevis assembly may include the step of forming threaded opening in the shelf. The method may include the step of attaching a knob and pin assembly to the opening in the shelf for presetting the movable tool jaw to a desired position. The method may include the step of adding a pneumatic line assembly between the pneumatic actuator and the source of pressurized gas. The method may include the step of adding a counter to the pneumatic line assembly. The method may include the step of adding a housing to house the movable tool jaw, the pneumatic cylinder, the modified connection linkage, and the trigger.

In another aspect, a tool with a connection linkage including a movable lever between a tool jaw and a handle is modified to include a pneumatic actuator having a piston rod. A connection assembly is between the piston rod and the movable lever. A trigger is between the pneumatic actuator and a source of pressurized gas.

In one embodiment, the connection assembly may include a clevis, a clevis pin, and a retaining ring. The clevis may include a base having an opening configured to engage the piston rod. The base may include a pair of opposing arms each having an opening therein configured to receive the clevis pin. The movable lever may include an opening sized to receive the clevis pin. The connection assembly may be configured to secure the movable lever to the piston rod by inserting the clevis pin between the openings in the opposing arms of the clevis and the opening in the movable lever and attaching a retaining ring to the clevis pin. The clevis may include a shelf extending from the base having an opening therein. The tool may include a knob and pin assembly securably connected to the opening in the shelf configured to preset the movable tool jaw to a desired position. The tool may include a pneumatic line assembly configured to connect the pneumatic actuator to the source of pressurized gas. The tool may include a counter connected to pneumatic line assembly.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
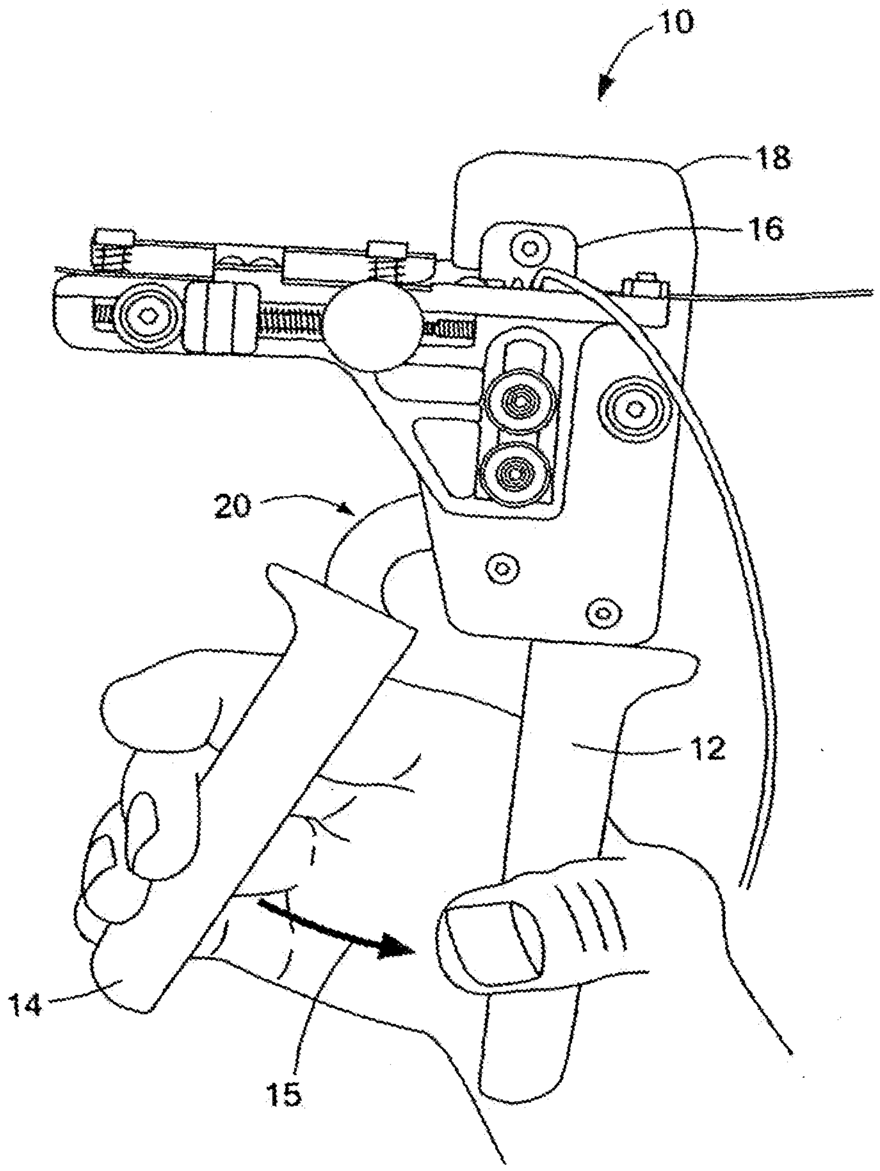
FIG. 1 (PRIOR ART)
FIG. 1 is a schematic front view of a typical conventional hand-held tool.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
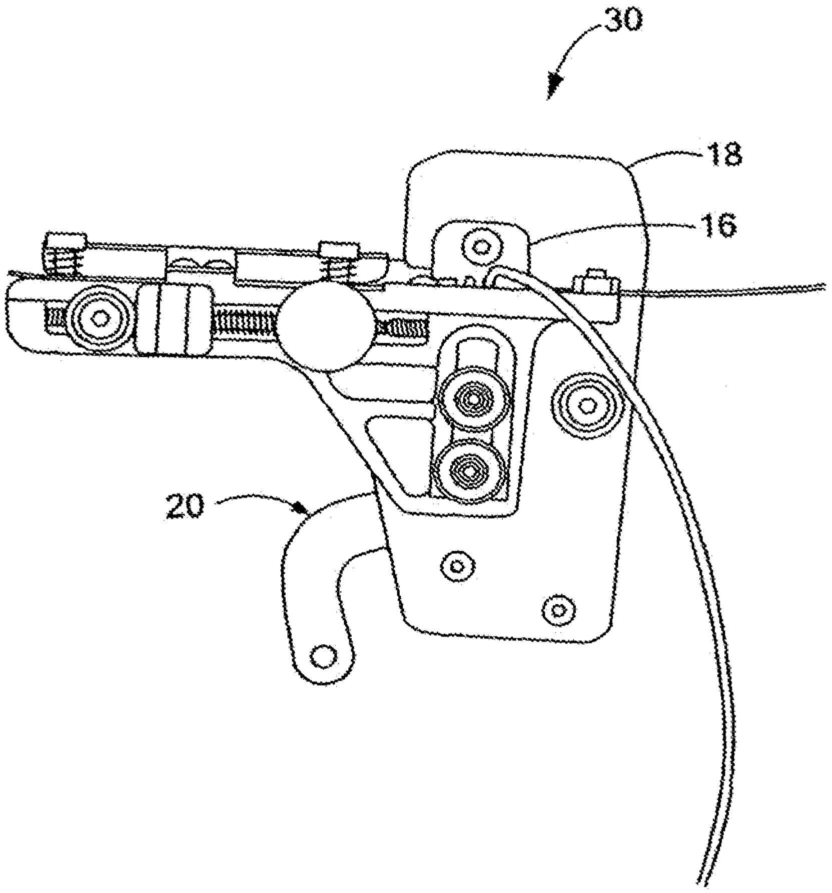
FIG. 2 (PRIOR ART)
FIG. 2 is a schematic front view showing the handles of the tool shown in FIG. 1 removed in accordance with one embodiment of the method of this invention.

There is shown in FIG. 1 typical conventional hand-held tool 10 having stationary handle 12 which is actuated by moving handle 14 in the direction indicated by arrow 15. Movable handle 14 is connected to movable tool jaw 16 of tool head 18 by connection linkage 20. Movable tool jaw 18 may be from a tool head of a crimping tool, a cutting tool, a modular jack tool, a riveting tool, or similar type tool. To overcome the problems associated with conventional tool 10 discussed in the Background section above, the method of modifying hand-held tool 10 of one embodiment of this invention includes removing stationary handle 12 and movable handle 14, as shown in FIG. 2. Pneumatic actuator 36, FIG. 3, with piston rod 67, shown in greater detail in FIG. 4, is then added. In one example, pneumatic actuator 36 may be a single acting pneumatic cylinder with an internal spring-return, available from McMaster Carr (New Brunswick, N.J.).

Figure 3:
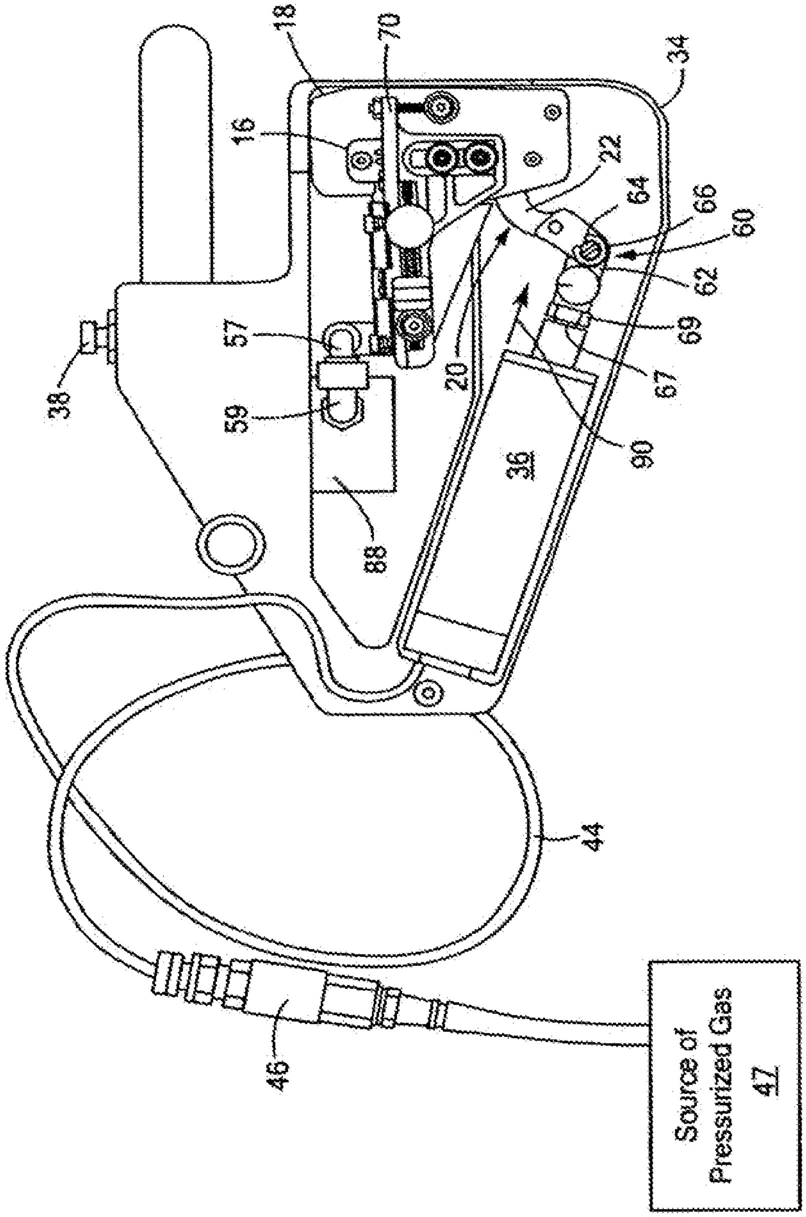
FIG. 3 is a schematic front view showing in further detail the steps of modifying the hand-held tool shown in FIG. 2.
Figure 4:
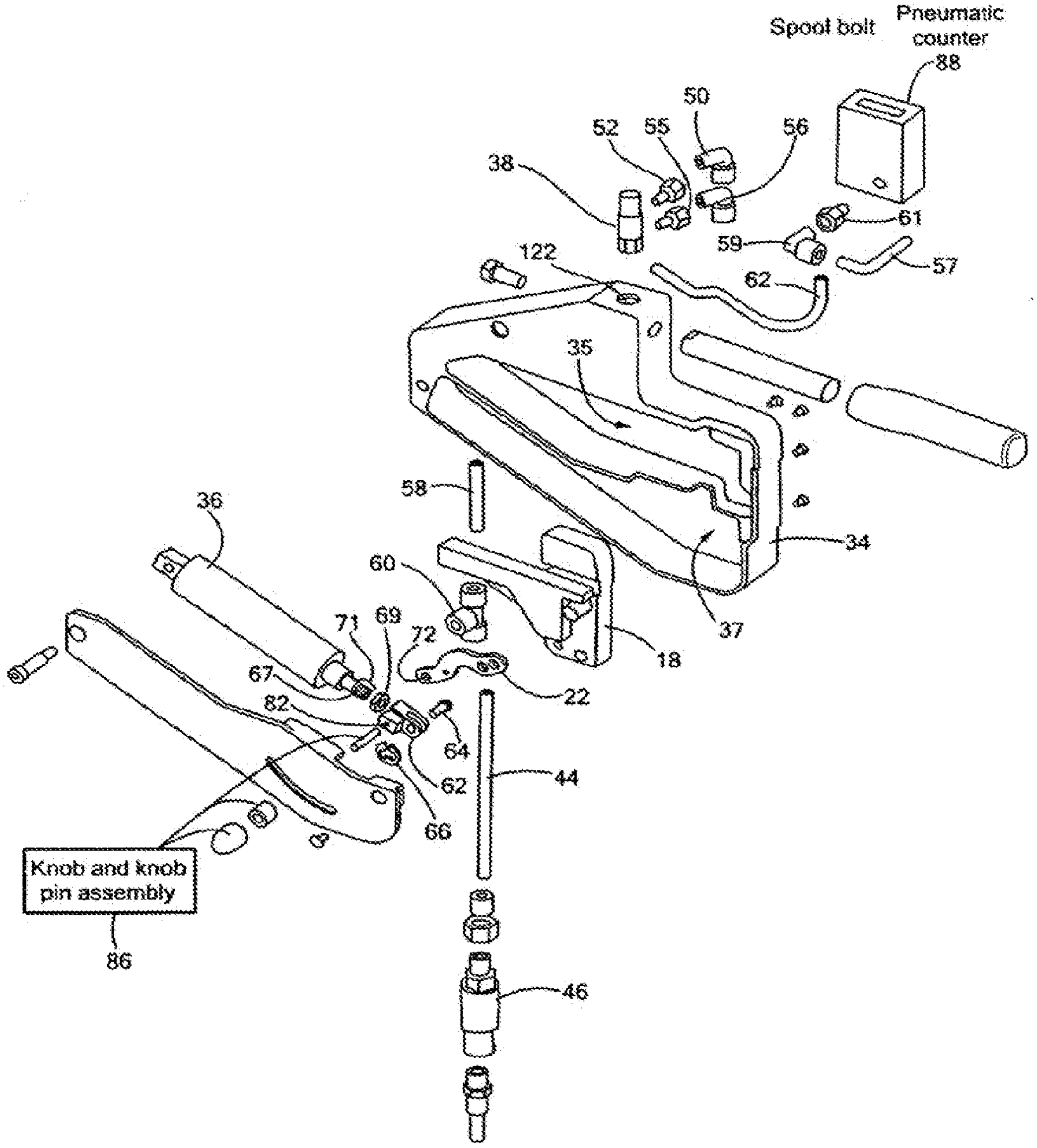
FIG. 4 is a three-dimensional exploded schematic view showing in further detail the primary components of the modified hand-held tool shown in FIG. 3.
Figure 5:
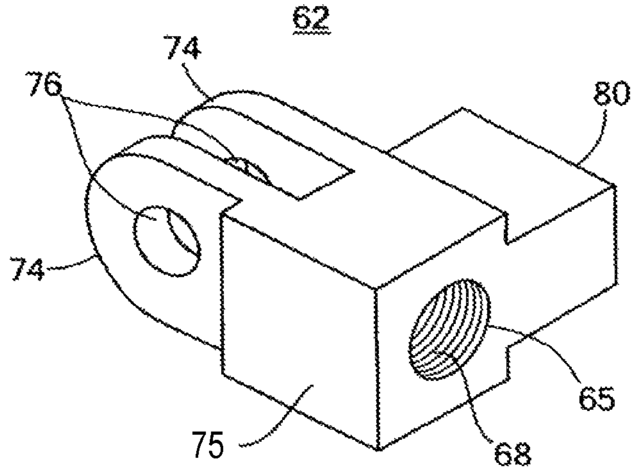
FIG. 5 is a three-dimensional front view showing in further detail one embodiment of the clevis assembly shown in FIGS. 3 and 4.

Connection linkage 20, FIG. 3, preferably includes lever 22 which is connected to 20 movable tool jaw 16 of tool head 18. The interconnection between level 22 and movable tool jaw 16 are conventional. The method of modify tool 10 may include adding clevis assembly 60 between piston rod 67 and lever 22. In one example, clevis assembly 60 includes clevis 62, clevis pin 64, and retaining ring 66. FIG. 4 shows in further detail one example of the structure of clevis 62 and clevis pin 64. Clevis 62, FIG. 5, preferably includes base 75 with opening 65 which engages piston rod 67, FIGS. 3 and 4. In one design, internal threads 68, FIG. 5, are formed in opening 65 which mate with external threads 71, FIG. 4, on piston rod 67. Clevis 62 is then secured to piston rod 67 by rotating clevis 62 about threads 71. Stop nut 69 is preferably threaded on threads 71 to position clevis 62 to the desired position. Clevis 62, FIG. 5, also preferably includes opposing arms 74 each having opening 76 therein which receive clevis pin 64, FIG. 4.

Figure 6:
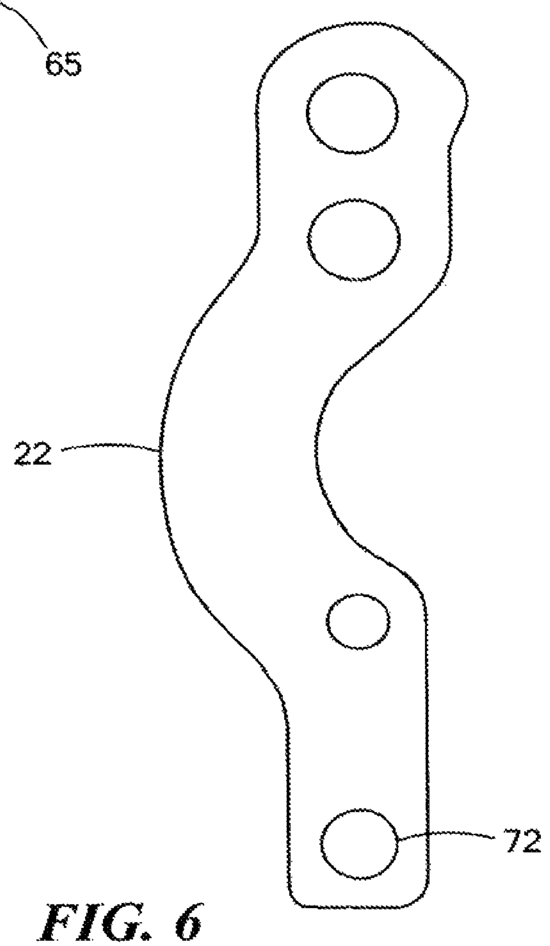
FIG. 6 is a schematic side view showing in further detail one example of a modified opening in the level of the modified connection linkage shown in FIGS. 3 and 4.

Preferably, lever 22, FIG. 3, of connection linkage 20 is modified by enlarging opening 72, FIG. 6, such that opening 72 can receive clevis pin 64, FIG. 4. Lever 22, FIG. 3, is then secured to clevis 62 (which is attached to piston rod 67 as discussed above) by inserting clevis pin 64, FIG. 4, through opening 72, FIG. 6 of lever 22 and then through opening 76, FIG. 5 in each of opposing arms 74 of clevis 62 and attaching retaining ring 66, FIG. 3, to clevis pin 64. Thus, connection linkage 20 has been modified to extend between piston rod 67 and movable tool jaw 16.

Trigger 38, FIG. 3, e.g., a pneumatic trigger valve, is added between pneumatic actuator 36 and source 47 of pressurized gas, e.g., air or similar type gas. Preferably, pressure regulator 46 is connected to line 44 coupled to pneumatic actuator 36. Pressure regulator 46 is preset to deliver a selectable predetermined pressure, e.g., about 50 to 70 psi, to pneumatic actuator 36 when trigger 38 is depressed. The selectable predetermined pressure enables pneumatic actuator 36 to provide a sufficient force and stroke in direction 90 when trigger 38 is depressed. Pneumatic actuator 36 then extends piston rod 67, FIGS. 3 and 4, which drives lever 22 such that it causes movable tool jaw 16, FIG. 3, of tool head 18 to be engaged to perform a crimp, cut, or similar type operation.

In one embodiment, clevis 62, FIG. 5, may include shelf 80 which includes opening 82, FIG. 4. Knob and pin assembly 86 is then secured opening 82 of clevis 62. Knob and pin assembly 86 allows movable tool jaw 16 to a preset desired position.

Figure 7:
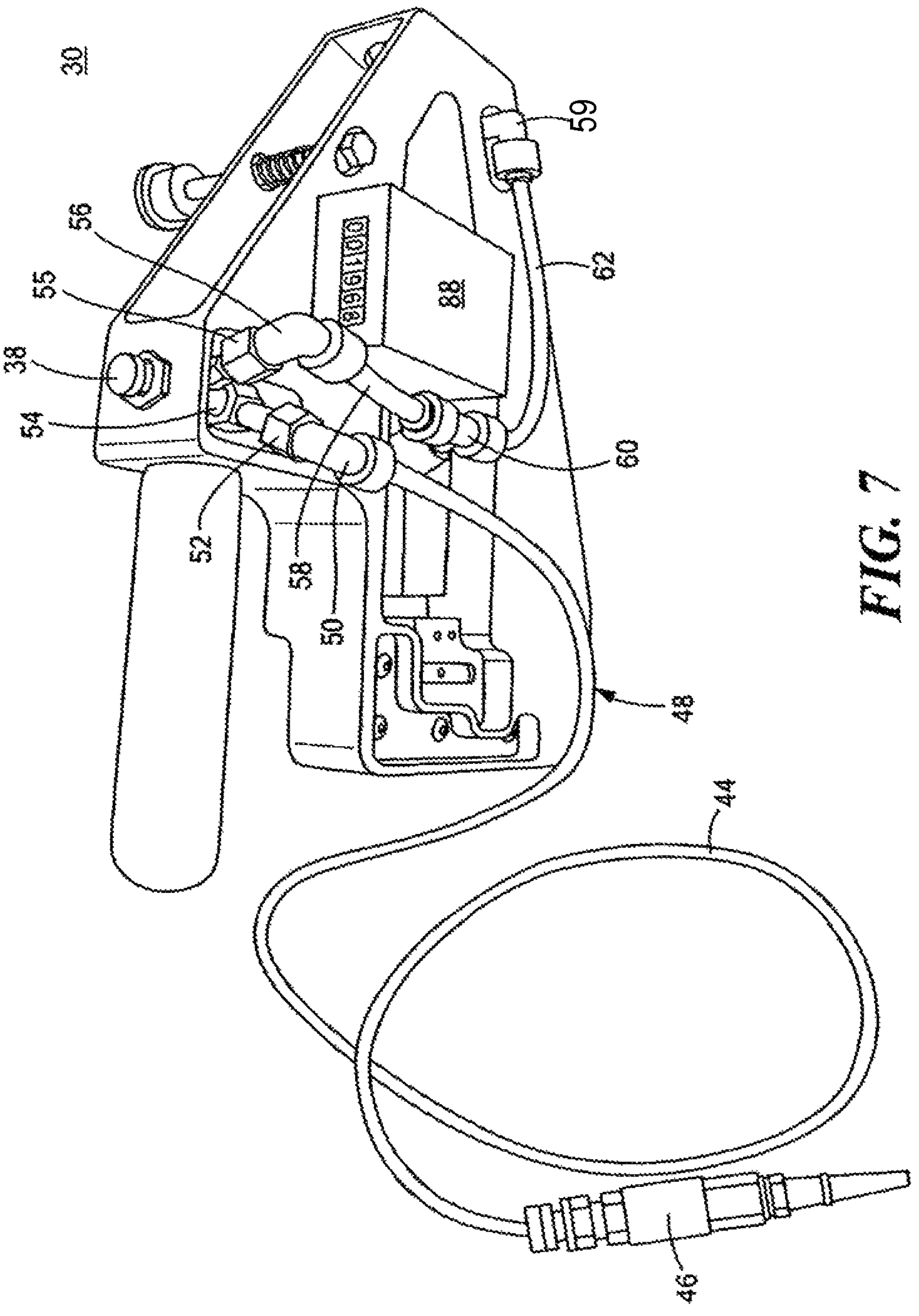
FIG. 7 is a three-dimensional back view showing in further detail one embodiment of a pneumatic line assembly and a counter added to the modified hand-held tool shown in FIG. 3.

In one embodiment, pneumatic line assembly 48, FIG. 7, is added to connect pneumatic actuator 36, FIG. 3, to source of pressurized gas 47. In this example, pneumatic line assembly 48, FIG. 7, includes line 44 connected to pneumatic elbow 59. Pneumatic elbow 59 is connected to trigger 38 by pneumatic fitting 52, shown in greater detail in FIG. 4. Pneumatic elbow 56, FIG. 7, is connected to trigger 38 by pneumatic fitting 55, also shown in FIG. 4. Pneumatic T-fitting 60, FIG. 7, is connected one end to line 58 and on the other end to pneumatic line 62. Pneumatic line 62 is connected to pneumatic elbow 64 which is attached to pneumatic actuator 36, FIG. 3. In one design, counter 88, FIG. 7, is connected to pneumatic T-fitting 60 by line 57, FIG. 3, and pneumatic elbow 59 and pneumatic fitting 61, FIG. 4. Counter 83 counts each time trigger 38 is depressed.

Housing 34, FIGS. 3 and 4, may be added to house pneumatic actuator 36, movable tool jaw 16, and modified connection linkage 22. In one example, pneumatic actuator 36 is housed in chamber 37, FIG. 4, and movable tool jaw 16 is housed in chamber 35. Trigger 38 is preferably secured in opening 122 of housing 34.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A tool with a connection linkage including a movable lever between a tool jaw and a removable handle, the tool modified to comprise:

- a pneumatic actuator having a piston rod;
- a connection assembly between the piston rod and the movable lever, the connection assembly includes a clevis, a clevis pin and a retaining ring, and the clevis includes a base with an opening configured to engage the piston rod and a shelf extending from the base having a second opening therein; and
- a trigger between the pneumatic actuator and a source of pressurized gas.

2. The tool of claim 1 in which the base includes a pair of opposing arms each having an opening therein configured to receive the clevis pin.

3. The tool of claim 2 in which the movable lever includes an opening sized to receive the clevis pin.

4. The tool of claim 3 in which the connection assembly is configured to secure the movable lever to the piston rod by inserting the clevis pin between the openings in the opposing arms of the clevis and the opening in the movable lever and attaching a retaining ring to the clevis pin.

5. The tool of claim 1 further including a knob and pin assembly securably connected to the opening in the shelf configured to preset the movable tool jaw to a desired position.

6. The tool of claim 1 further including a pneumatic line assembly configured to connect the pneumatic actuator to the source of pressurized gas.

7. The tool of claim 6 further including a counter connected to the pneumatic line assembly.

8. The tool of claim 1 comprising a housing having first and second chambers, the first chamber is configured to receive the tool having the tool jaw, the first and second chambers are configured to receive the connection linkage including the movable lever interposed between the movable tool jaw and the removable handle, and the pneumatic actuator and the connection assembly are received within the second chamber.

9. A tool comprising:

a tool head including a movable tool jaw;

a connection linkage, the connection linkage including a movable lever rotatably coupled with the movable tool jaw, and movement of the movable lever moves the movable tool jaw; and wherein the connection linkage is configured for operation in manual and pneumatic modes:

in the manual mode a movable handle is coupled with the movable lever, and movement of the movable handle is transmitted through the movable lever to the movable tool jaw, in the pneumatic mode the movable handle is removed, a pneumatic actuator having a piston rod is coupled with a connection assembly and with a source of pressurized gas, the connection assembly is coupled between the piston rod and the movable lever, a trigger is interposed between the pneumatic actuator and the source of pressurized gas, and movement of the piston rod is transmitted through the movable lever to the movable tool jaw, and the connection assembly includes:

a clevis with a base having an opening configured to engage the piston rod, and a shelf extends from the base having an opening therein, a clevis pin, and a retaining ring.

10. The tool of claim 9 comprising a knob and pin assembly securably connected to the opening in the shelf configured to preset the movable tool jaw to a desired position.

11. The tool of claim 9 comprising a pneumatic line assembly connecting the pneumatic actuator to the source of pressurized gas.

12. The tool of claim 11 comprising a counter connected to the pneumatic line assembly.

13. A tool comprising:

a housing including at least first and second chambers, the first chamber is configured to receive a tool having a movable tool jaw, the first and second chambers are configured to receive a connection linkage including a movable lever interposed between the movable tool jaw and a removable handle;

a pneumatic actuator having a piston rod received within the second chamber;

a connection assembly configured for positioning between the piston rod and the movable lever, the connection assembly received within the second chamber;

a knob and pin assembly securably connected to the connection assembly and configured to preset the movable tool jaw to a desired position; and a trigger interposed between the pneumatic actuator and a source of pressurized gas, the trigger coupled with the housing.

14. The tool of claim 13, wherein the connection assembly includes a clevis, a clevis pin, and a retaining ring.

* * * * *